United States Patent
Pilipetskii et al.

(10) Patent No.: US 6,571,032 B1
(45) Date of Patent: May 27, 2003

(54) APPARATUS AND METHOD FOR MULTIPLEXING AND/OR DEMULTIPLEXING OPTICAL SIGNALS HAVING SUBSTANTIALLY EQUAL DISPERSION

(75) Inventors: Alexei N. Pilipetskii, Colts Neck, NJ (US); Franklin W. Kerfoot, III, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/706,418

(22) Filed: Nov. 6, 2000

(51) Int. Cl.[7] .................................................. G02B 6/28

(52) U.S. Cl. ........................... 385/24; 359/124; 359/161

(58) Field of Search .............................. 385/24; 359/124, 359/161, 179, 122, 181

(56) References Cited

U.S. PATENT DOCUMENTS

| | | | | |
|---|---|---|---|---|
| 5,224,183 A | | 6/1993 | Dugan ........................ 385/24 |
| 5,392,147 A | * | 2/1995 | Kaede et al. ................ 359/181 |
| 5,546,210 A | * | 8/1996 | Chraplyvy et al. .......... 359/124 |
| 5,559,920 A | * | 9/1996 | Chraplyvy et al. .......... 385/123 |
| 5,841,557 A | * | 11/1998 | Otsuka et al. ............... 359/122 |
| 6,021,235 A | * | 2/2000 | Yamamoto et al. ........... 385/24 |
| 6,275,314 B1 | * | 8/2001 | Ishikawa et al. ............ 359/124 |
| 6,456,755 B1 | * | 9/2002 | Sonoda ........................ 385/24 |

* cited by examiner

Primary Examiner—Ellen E. Kim

(57) ABSTRACT

An apparatus for communicating data through information channels each being associated with its own wavelength comprises modulators and an optical multiplexer. Each modulator is associated with its own wavelength. The optical multiplexer is operationally coupled to the modulators. The optical multiplexer receives multiple input optical signals each of which is received from its own modulator. Each input optical signal has its own dispersion substantially equal to a dispersion of each remaining input optical signals.

14 Claims, 4 Drawing Sheets

APPARATUS AND METHOD FOR MULTIPLEXING AND/OR DEMULTIPLEXING OPTICAL SIGNALS HAVING SUBSTANTIALLY EQUAL DISPERSION

BACKGROUND OF THE INVENTION

The present invention relates generally to terminal equipment for an optical communication system. More specifically, the present invention relates to optical transmitters multiplexing and optical receivers demultiplexing signals having substantially equal dispersion.

U.S. Pat. No. 5,224,183, entitled "Multiple Wavelength Division Multiplexing Signal Compensation System and Method Using Same" and issued on Jun. 29, 1993, discloses a wavelength-division multiplexing (WDM) system. FIG. 1 illustrates a wavelength-division multiplexing system disclosed in U.S. Pat. No. 5,224,183. As FIG. 1 illustrates, each wavelength has an associated laser coupled to a dispersion-compensation fiber, which in turn is coupled to a common wavelength division multiplexer. For example, lasers 12, 14 and 16 are coupled to dispersion-compensation fibers 18, 20 and 22, respectively, which are coupled to wavelength division multiplexer 24. In this example, the wavelength of laser 12 is 1540 nm; the wavelength of laser 14 is 1550 nm; the wavelength of laser 16 is 1560 nm. Wavelength division multiplexer 24 is coupled to a an additional dispersion-compensating fiber 26 and transmission fiber 28.

This known system individually compensates the dispersion associated with each wavelength before the optical signals are multiplexed by the wavelength division multiplexer (and after the optical signals are demultiplexed by the wavelength division demultiplexer (not shown in FIG. 1)). This is performed for each wavelength by a separate and unique dispersion-compensation fiber associated with that wavelength: dispersion compensation fiber 12 has a dispersion of −20 ps/nm at its wavelength (1540 nm), dispersion-compensation fiber 14 has a dispersion of −200 ps/nm at its wavelength (1550 nm), and dispersion-compensation fiber 16 has a dispersion of −360 ps/nm at its wavelength (1550 nm). These dispersion-compensation fibers compensate individually for each particular wavelength to produce a unique residual dispersion associated with each wavelength. Each wavelength is subsequently compensated by the dispersion-compensation fiber 26 and transmission fiber 28. By eliminating the residual dispersion associated with each wavelength at the wavelength-division multiplexer 24, the dispersion of all of the wavelengths at the end of the transmission fiber 28 can be controlled to a desired amount, such as for example, approximately zero dispersion for approximately all of the wavelengths.

Such a WDM system, however, suffers several shortcomings. First, each wavelength requires a separate and unique dispersion-compensating fiber disposed, for example, between the respective laser and the wavelength-division multiplexer of the optical transmitter. Similarly, each wavelength requires a separate and unique dispersion-compensation fiber disposed, for example, between the wavelength-division multiplexer and the respective detector (not shown in FIG. 1). As WDM systems having more and more information channels are designed, adding more and more dispersion-compensation fibers associated with each wavelength make the WDM system more complex and expensive.

Second, polarization of the optical signals received by the wavelength-division multiplexer cannot be maintained due to the unique dispersion-compensation fibers required by each wavelength. Consequently, although desirable for the optical signals associated with each wavelength to have an associated polarization that is orthogonal to adjacent wavelengths, such an arrangement is not possible where the polarization cannot be maintained.

SUMMARY

An apparatus for communicating data through information channels each being associated with its own wavelength comprises modulators and an optical multiplexer. Each modulator is associated with its own wavelength. The optical multiplexer is operationally coupled to the modulators. The optical multiplexer receives multiple input optical signals each of which is received from its own modulator. Each input optical signal has its own dispersion substantially equal to a dispersion of each remaining input optical signals.

DETAILED DESCRIPTION

An apparatus for communicating data through information channels each being associated with its own wavelength comprises modulators and an optical multiplexer. Each modulator is associated with a particular wavelength. The optical multiplexer is operationally coupled to the modulators. The optical multiplexer receives multiple input optical signals each of which is received from its own modulator. Each input optical signal has its own dispersion substantially equal to a dispersion of each remaining input optical signal.

Unlike the known system where each information channel (i.e., each optical signal associated with a particular wavelength) is individually dispersion compensated with a unique amount of dispersion, optical transmitters and optical receivers of the present invention (e.g., as disposed within terminal equipment) need not satisfy such a requirement. Each such information channel need not be individually dispersion compensated where the optical transmitter and/or optical receiver are coupled to a transmission fiber having a zero dispersion-slope. In such transmission fiber, dispersion compensation is performed substantially equally for all of the information channels (i.e., for all of the associated wavelengths). Consequently, these optical transmitters and optical receivers can multiplex and demultiplex, respectively, optical. signals having substantially equal dispersion. Thus, for example, the optical transmitters and optical receivers need not include any wavelength-specific dispersion-compensating fibers. Of course, this advantageously reduces the complexity and expense of such optical transmitters and optical receivers.

Figure 1:
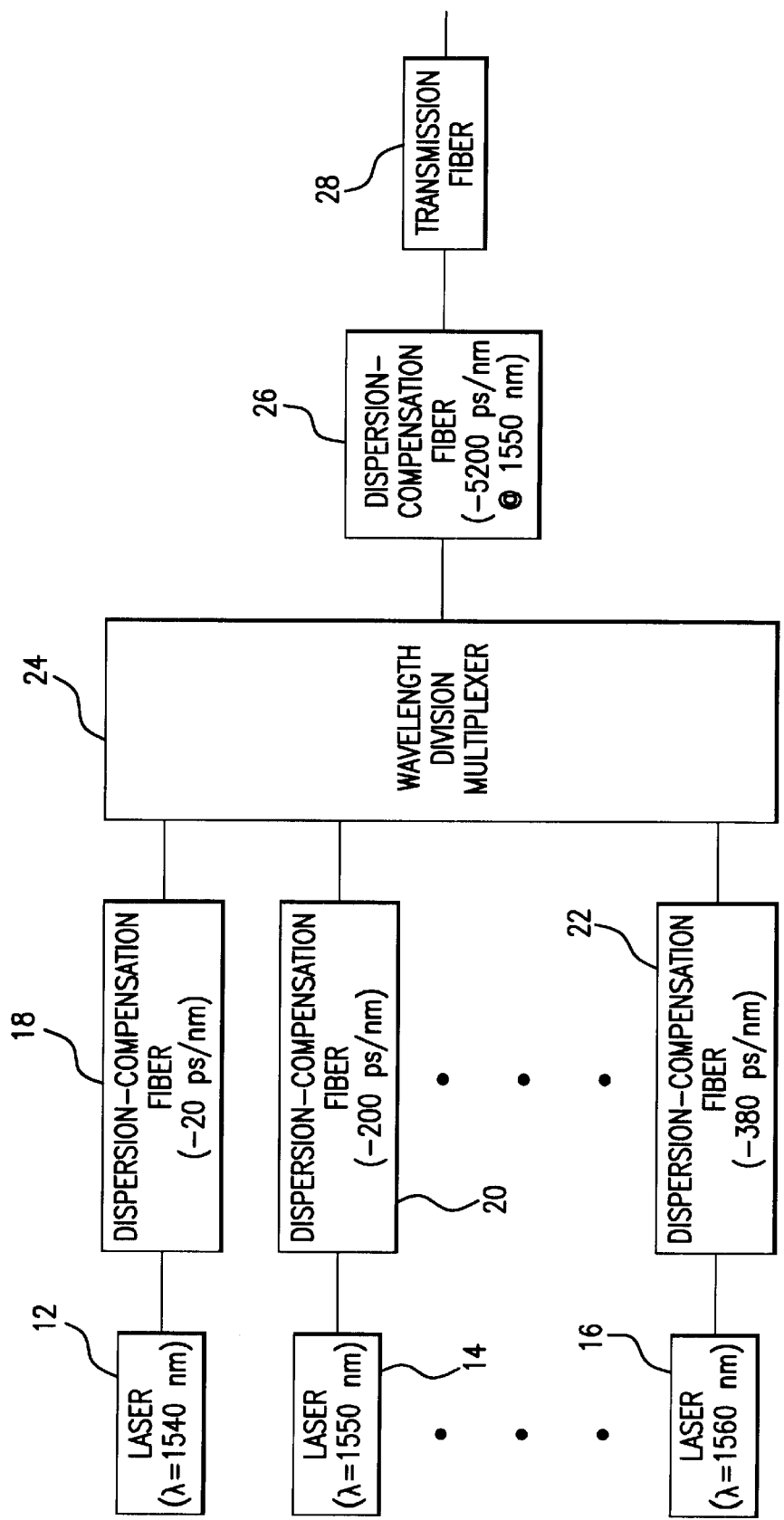
FIG. 1 illustrates a known wavelength-division multiplexing system.
Figure 2:
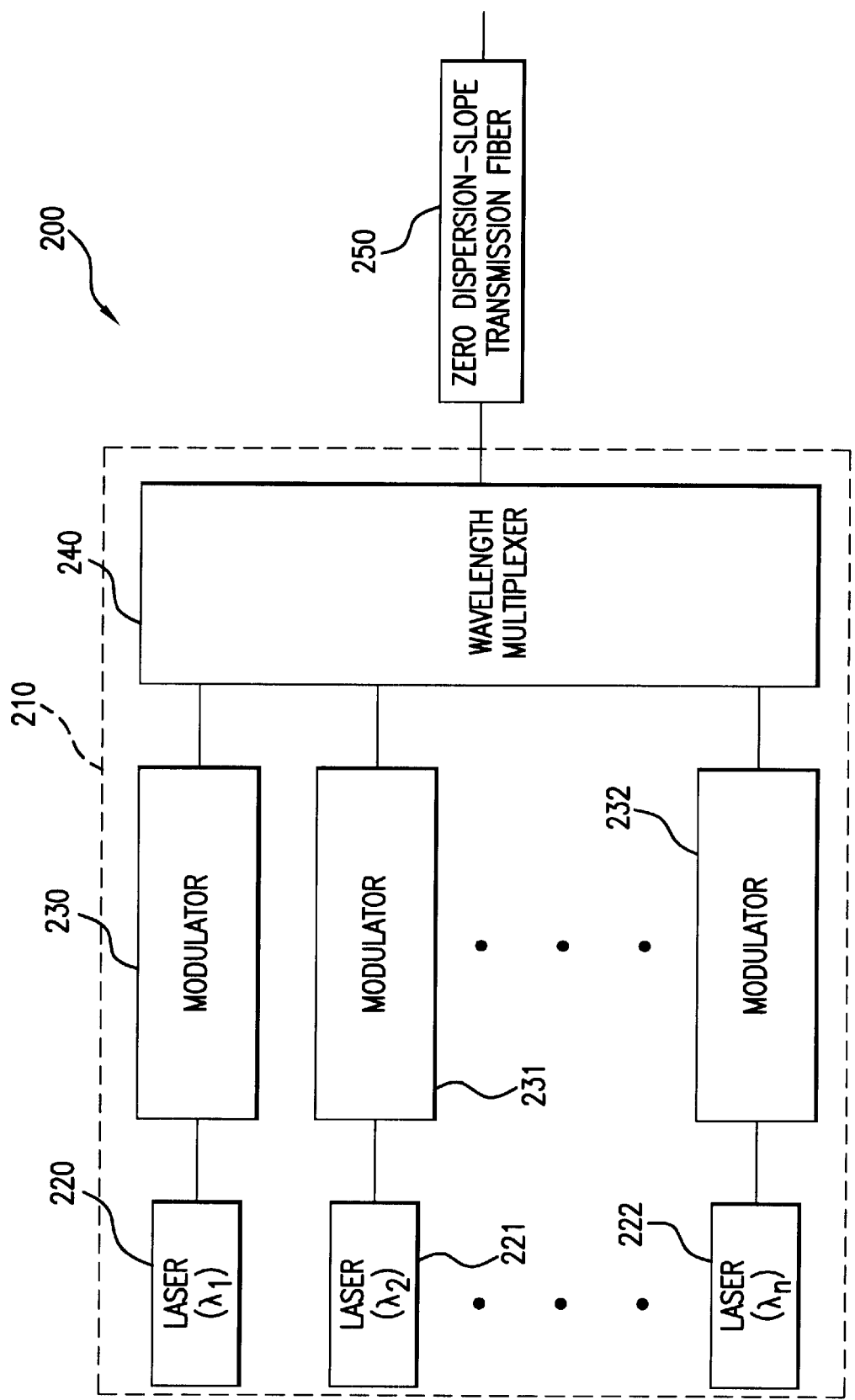
FIG. 2 illustrates an optical system having an optical transmitter, according to an embodiment of the present invention.

FIG. 2 illustrates an optical system having an optical transmitter, according to an embodiment of the present invention. Optical system 200 includes optical transmitter 210 and zero-dispersion-slope transmission fiber 250. Optical transmitter 210 includes a series of lasers 220, 221 through 222. Each laser has an associated wavelength, for example, lasers 220, 221, and 222 have the associated wavelengths $\lambda_1$, $\lambda_2$ and $\lambda_n$, respectively, centered around, for example, 1550 nm. Each laser 220 through 222 is coupled to its own modulator 230 through 232, respectively. For example, laser 220 is coupled to modulator 230, laser 221 is coupled to modulator 231, and laser 222 is coupled to modulator 232. Modulators 230 through 232 are coupled to wavelength multiplexer 240. Transmitter 210 is operationally coupled to zero-dispersion-slope transmission fiber 250 via wavelength multiplexer 240.

Transmission fiber 250 has a commutative dispersion-slope substantially equal to zero. For example, such a transmission fiber can have a zero dispersion-slope through an appropriate combination of first fiber-type segments having a positive dispersion slope and second fiber-type segments having a negative dispersion slope.

The first fiber type can have, for example, a dispersion, $D_1$, of 16.9 ps/nm-km; a dispersion slope, $D_1'$, of 0.06 ps/nm²-km; and an effective area of 75 $\mu m^2$. Such a type of optical fiber is commercially available as a single-mode fiber (SMF)@. The SMF fiber is produced by several fiber manufacturers including Corning and Lucent. The relative dispersion slope of the first fiber type equals the ratio of the first-fiber-type dispersion slope and dispersion, $D'_1/D_1$.

The second fiber type can have, for example, a dispersion, $D_2$, of -17.0 ps/nm-km; a dispersion slope, $D_2'$, of -0.06 ps/nm²-km; and an effective area of 35 $\mu m^2$. Such a type of optical fiber has been designated commercially as A1x inverse-dispersion fiber (1x-IDF)@. Another example of an optical fiber having a negative dispersion slope is the optical fiber designated commercially as A2x-IDF@ which has a dispersion of -34.0 ps/nm-km and a dispersion slope of -0.12 ps/nm²-km and an effective area of about 34 $\mu m^2$. Both the 1x-IDF and the 2x-IDF fibers are produced by Lucent.

The relative dispersion slope of the second fiber type equals the ratio of the second-fiber-type dispersion slope and dispersion, $D'_2/D_2$. By appropriately selecting the dispersion and dispersion slope of the first fiber type and of the second fiber type, the relative dispersion slope of the first fiber type and of the second fiber type can be selected to be approximately equal.

Examples of such transmission fibers having a commutative dispersion-slope substantially equal to zero are discussed in the following related applications: "Method and Apparatus for the Optimization of Dispersion Map Using Slope Compensating Optical Fibers" and "Method and Apparatus for Optimizing the Dispersion and Dispersion Slope for a Dispersion Map with Slope Compensating Optical Fibers"; both of which are incorporated herein by reference.

Figure 3:
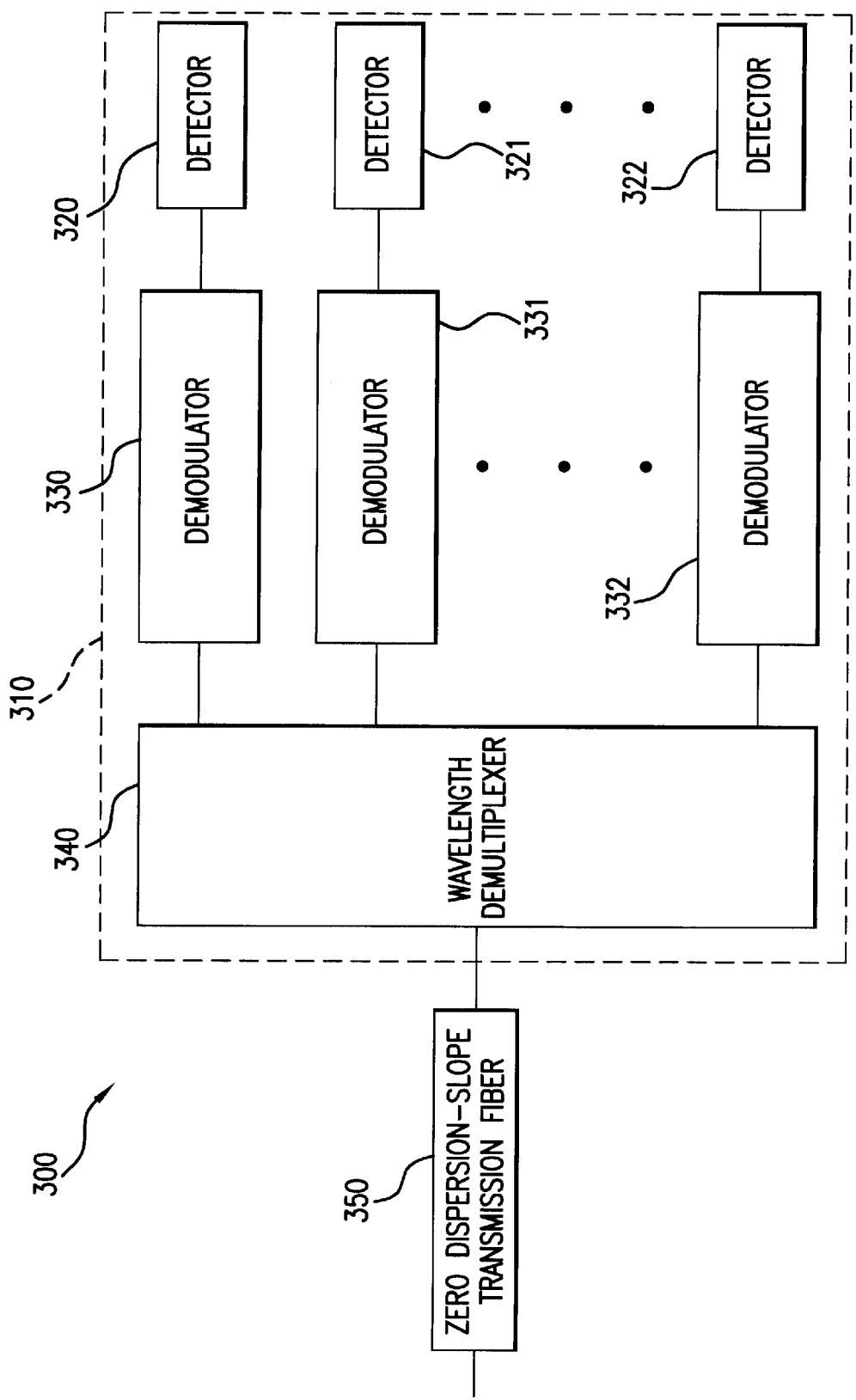
FIG. 3 illustrates an optical system including a receiver system, according to an embodiment of the present invention.

FIG. 3 illustrates an optical system including a receiver system, according to an embodiment of the present invention. The optical system (including the receiver system) shown in FIG. 3 can be used in conjunction with the optical system (including the transmitter system) shown in FIG. 2 (of course, a single zero-dispersion-slope transmission fiber can be considered).

Optical system 300 includes optical receiver 310 and zero-dispersion-slope transmission fiber 350. Optical receiver 310 includes a series of detectors 320 through 322. Each detector 320 through 322 are connected to demodulators 330 through 332, respectively. For example, detector 320 is coupled to demodulator 330, detector 331 is coupled to demodulator 331 and detector 322 is coupled to demodulator 332. Demodulators 330 through 332 are coupled to wavelength demultiplexer 340. Optical receiver 310 is operationally coupled to zero-dispersion-slope transmission fiber 350 through wavelength demultiplexer 340.

As the examples shown in FIGS. 2 and 3 illustrate, these optical transmitters and optical receivers can multiplex and demultiplex, respectively, optical signals having substantially equal dispersion. Thus, for example, the optical transmitters and optical receivers need not include any wavelength-specific dispersion-compensating fibers. Of course, this advantageously reduces the complexity and expense of such optical transmitters and optical receivers.

In an alternative of the embodiment of the invention, rather than having absolutely no dispersion compensating fibers within the optical transmitters and receivers, it is possible that dispersion-compensation fibers can be included where each of the dispersion-compensation fibers introduce substantially the same amount of dispersion.

Figure 4:
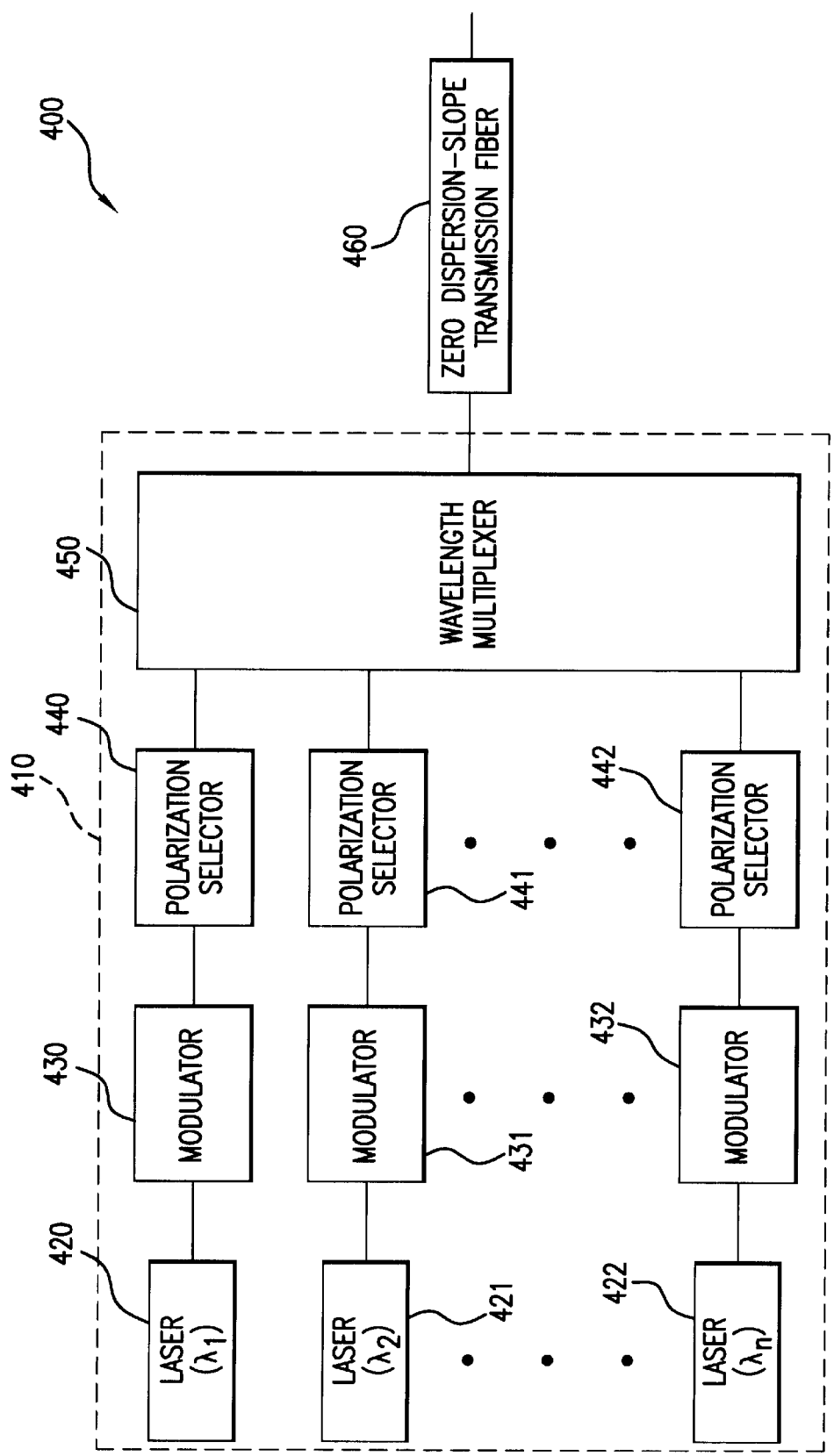
FIG. 4 illustrates an optical system including an optical receiver, according to another embodiment of the present invention.

FIG. 4 illustrates an optical system including an optical receiver, according to another embodiment of the present invention. Optical transmitter 410 is coupled to zero-dispersion-slope transmission fiber 460. Optical transmitter 410 includes lasers 420, 421 through 422. Again, each laser has its own associated wavelength. For example, lasers 420 through 422 can be associated with wavelengths $\lambda_1$, $\lambda_2$ and $\lambda_n$, respectively. Each of the lasers 420 through 422 are coupled to its own modulator 430 through 432, respectively. For example, laser 420 is coupled to modulator 430, laser 421 is coupled to modulator 431, and laser 422 is coupled to modulator 432. Modulators 430 through 432 are each coupled to its own polarization selector 440 through 442. For example, modulator 430 is coupled to polarization selector 440, modulator 431 is coupled to polarization selector 441, and modulator 432 is coupled to polarization selector 442. Polarization selectors 440 through 442 are coupled to wavelength multiplexer 450. Optical transmitter 410 is coupled to zero-dispersion-slope transmission fiber 460 via wavelength multiplexer 450.

Polarization selectors 440 through 442 allow the optical signals received from the modulators 430 through 432, respectively, to be sent to wavelength multiplexer 450 so that the optical signals each have a specific polarization that is orthogonal to the polarization of adjacent information channels (i.e., for the optical signals having next lower wavelength and next higher wavelength).

More specifically, polarization selectors 440 through 442 can be configured, for example, so that the specific polarization selected for a given information channel is orthogonal to the polarization for the adjacent information channel. Said another way, the specific polarization selected for a given wavelength can be, for example, orthogonal from the polarization selected for that of the next lower wavelength and the next higher wavelength. For example, polarization selector 440 can be configured to select a vertical linear polarization; polarization selector 441 which can be associated with the next higher wavelength (i.e., adjacent to that of polarization selector 440), can be configured to select, for example, horizontal linear polarization. The next polarization selector for the next higher wavelength (i.e., adjacent to that associated with polarization selector 441) can be configured to select vertical linear polarization. Accordingly, the remaining polarization selectors can be configured to select orthogonal polarizations in an alternating manner through to polarization selector 442.

Polarization selectors 440 through 442 can be any appropriate device which outputs an optical signal in a particular polarization. For example, polarization selectors 440 through 442 can be a polarization beam splitter where only one of the two potential polarized light signals are coupled to the wavelength multiplexer 450.

By selecting alternating orthogonal polarizations for the information channels (i.e., for the optical signals associated with the range of wavelengths), better system performance can be achieved because potential sources of interchannel cross-talk, such as for example, intersymbol interference (ISI) can be reduced. Because each of the optical signals (e.g., entering and leaving the wavelength multiplexer and wavelength demultiplexer) have substantially the same amount of dispersion, the polarization selected by the polarization selectors 440 through 442 and associated with the respective optical signals can be maintained until they are multiplexed by wavelength multiplexer 450. Furthermore, because the transmission fiber 460 has a zero dispersion-slope the optical signals at all of the wavelengths are equally dispersion compensated. In addition, the relative polarization states of the channels set by the polarization selectors 440 through 442 can be maintained until they are demultiplexed by a wavelength demultiplexer within the optical receiver (not shown in FIG. 4). Thus, once the optical signals are received at the receiver, the optical signals still have substantially the same amount of dispersion and additional wavelength-specific dispersion compensation is not needed.

Said another way, individually varied dispersion for each associated wavelength is not required within the optical transmitter 410, the transmission fiber 460 or the optical receiver (not shown in FIG. 4). The relative polarization states of the optical signals can be maintained from the optical transmitter 410 to it associated optical receiver (are not shown in FIG. 4). Therefore, the benefits expected from associating orthogonal polarization with the various information channels (and their respective associated wavelengths) can be achieved.

In an alternative of the embodiment of the invention, rather than having absolutely no dispersion compensating fibers within the optical transmitters and receivers, it is possible that dispersion-compensation fibers can be included where each of the dispersion-compensation fibers introduce substantially the same amount of dispersion. In such a case, because the same amount of dispersion is introduced into each optical signal for all the wavelengths, the polarization introduced by polarization selectors of the optical transmitter can be maintained through to the wavelength multiplexer as well as through to the zero-dispersion-slope transmission fiber and the wavelength demultiplexer of the optical receiver.

It should, of course, be understood that while the present invention has been described in reference to particular configurations, other configurations should be apparent to those of ordinary skill in the art. For example, although certain components are discussed as being coupled or operationally coupled to other components, other intervening components can be possible, such as optical fiber couplers, etc.

What is claimed is:

1. An apparatus for communicating data through a plurality of information channels each being associated with its own wavelength, said apparatus comprising:

a plurality of modulators each being associated with its own wavelength;

an optical multiplexer operationally coupled to said plurality of modulators, said optical multiplexer receiving a plurality of input optical signals, each input optical signal from the plurality of input optical signals being received from its own modulator from the plurality of modulators, each input optical signal from the plurality of input optical signals having its own dispersion substantially equal to a dispersion of each remaining input optical signal from the plurality of input optical signals; and a transmission optical fiber operationally coupled to said optical multiplexer and including a plurality of dispersion-compensation fiber segments, said optical multiplexer being disposed between said plurality of modulators and said transmission optical fiber, said plurality of dispersion-compensation fiber segments having an end-to-end dispersion slope substantially equal to zero.

2. The apparatus of claim 1, wherein:

the dispersion of each input optical signal from the plurality of input optical signals is substantially equal to zero.

3. The apparatus of claim 1, wherein:

substantially all of the modulators from the plurality of modulators being operationally coupled to said optical multiplexer without intervening dispersion-compensating fibers.

4. The apparatus of claim 1, further comprising:

a plurality of polarization selectors, each polarization selector from the plurality of polarization selectors being operationally coupled to its own modulator from the plurality of modulators, each polarization selector from the plurality of polarization selectors being disposed between its own modulator from the plurality of modulators and said optical multiplexer.

5. The apparatus of claim 1, further comprising:

a plurality of polarization selectors, each polarization selector from the plurality of polarization selectors being operationally coupled to its own modulator from the plurality of modulators, each polarization selector from the plurality of polarization selectors being disposed between its own modulator from the plurality of modulators and said optical multiplexer, each polarization selector from the plurality of polarization selectors having an associated polarization orthogonal to a polarization associated with adjacent information channels from the plurality of information channels.

6. The apparatus of claim 1, further comprising:

a plurality of polarization selectors, each polarization selector from the plurality of polarization selectors being operationally coupled to its own modulator from the plurality of modulators, a plurality of lasers each being coupled operationally coupled to its own modulator from the plurality of modulators.

7. An apparatus for communicating data through a plurality of information channels each being associated with its own wavelength, said apparatus comprising:

an optical demultiplexer, said optical demultiplexer producing a plurality of output optical signals, each output optical signal from the plurality of output optical signals being associated with its own wavelength;

a plurality of demodulators each being associated with its own wavelength and being operationally coupled to said optical demultiplexer, each output optical signal from, the plurality of output optical signals having its own dispersion substantially equal to a dispersion of the remaining output optical signals from the plurality of output optical signals; and a transmission optical fiber operationally coupled to said optical demultiplexer and including a plurality of dispersion-compensation fiber segments, said optical demultiplexer being disposed between said plurality of demodulators and said transmission optical fiber, said plurality of dispersion-compensation fiber segments having an end-to-end dispersion slope substantially equal to zero.

8. The apparatus of claim 7, wherein:

each output optical signal from the plurality of output optical signals having a dispersion substantially equal to zero.

9. The apparatus of claim 7, wherein:

substantially all of the demodulators from the plurality of demodulators being operationally coupled to said optical multiplexer without intervening dispersion-compensating fibers.

10. A method for communicating data through a plurality of information channels each being associated with is own wavelength, said method comprising:

receiving, at an optical multiplexer, a plurality of input optical signals each being associated with its own wavelength, each input optical signal from the plurality of input optical signals having a dispersion substantially equal to a dispersion of the remaining input optical signals from the plurality of input optical signals;

multiplexing the plurality of input optical signals to produce an output optical signal; and sending the output optical signal from the optical multiplexer, wherein the output optical signal is sent from the optical multiplexer to a transmission optical fiber including a plurality of dispersion-compensation fiber segments, said plurality of dispersion-compensation fiber segments having an end-to-end dispersion slope substantially equal to zero.

11. The method of claim 10, wherein:

each input optical signal from the plurality of input optical signals having a dispersion substantially equal to zero.

12. The method of claim 10, further comprising:

selecting a polarization of each input optical signal form the plurality of input optical signals, each input optical signal from the plurality of input optical signals having an associated polarization orthogonal to a polarization associated with adjacent information channels from the plurality of information channels.

13. A method for communicating data through a plurality of information channels each being associated with its own wavelength, said method comprising:

receiving, at an optical demultiplexer, an input optical signal having a multiplexed plurality of information channels;

demultiplexing the multiplexed plurality of information channels to produce a plurality of output optical signals, each output optical signal from the plurality of output optical signals having its own dispersion substantially equal to a dispersion of the remaining output optical signals from the plurality of output optical signals; and sending the plurality of output optical signals from the optical demultiplexer, wherein the input optical signal is received at the optical demultiplexer from a transmission optical fiber including a plurality of dispersion-compensation fiber segments, said plurality of dispersion-compensation fiber segments having an end-to-end dispersion slope substantially equal to zero.

14. The method of claim 13, wherein:

each output optical signal from the plurality of output optical signals having a dispersion substantially equal to zero.

* * * * *